United States Patent
Tamaki et al.

(10) Patent No.: US 9,570,957 B2
(45) Date of Patent: Feb. 14, 2017

(54) GEARBOX, AND METHOD FOR MANUFACTURING THE SAME

(71) Applicant: MABUCHI MOTOR CO., LTD., Matsudo (JP)

(72) Inventors: Takashi Tamaki, Matsudo (JP); Satoshi Kikuchi, Matsudo (JP)

(73) Assignee: Mabuchi Motor Co., Ltd, Matsudo (JP)

( * ) Notice: Subject to any disclaimer, the term of this patent is extended or adjusted under 35 U.S.C. 154(b) by 84 days.

(21) Appl. No.: 14/308,120

(22) Filed: Jun. 18, 2014

(65) Prior Publication Data

US 2014/0373658 A1 Dec. 25, 2014

(30) Foreign Application Priority Data

Jun. 19, 2013 (JP) ................. 2013-128904

(51) Int. Cl.
| | |
|---|---|
| *H02K 7/116* | (2006.01) |
| *F16H 1/16* | (2006.01) |
| *H02K 15/14* | (2006.01) |
| *B29C 45/14* | (2006.01) |
| *H02K 5/22* | (2006.01) |
| *F16H 57/039* | (2012.01) |

(Continued)

(52) U.S. Cl.
CPC ....... *H02K 7/1166* (2013.01); *B29C 45/14639* (2013.01); *F16H 1/16* (2013.01); *F16H 57/039* (2013.01); *H02K 5/10* (2013.01); *H02K 5/225* (2013.01); *H02K 15/14* (2013.01); *B29L 2031/3481* (2013.01); *F16H 2057/0325* (2013.01); *Y10T 74/19828* (2015.01)

(58) Field of Classification Search
CPC ...... H02K 7/1166; H02K 15/14; H02K 5/225; H02K 5/10; F16H 57/039; F16H 1/16; B29C 45/14639; B29L 2031/3481; Y10T 74/19828; Y10T 74/2186

See application file for complete search history.

(56) References Cited

U.S. PATENT DOCUMENTS 4,398,135 A * 8/1983 Busch ............... B60S 1/08
                                            310/239
4,572,979 A * 2/1986 Haar ............... H01R 39/383
                                            310/239

(Continued)

FOREIGN PATENT DOCUMENTS

| | | |
|---|---|---|
| GB | 688559 A | 3/1953 |
| JP | 3568415 | 10/2000 |

*Primary Examiner* — Thomas Diaz
(74) *Attorney, Agent, or Firm* — Schwabe, Williamson & Wyatt, P.C.

(57) ABSTRACT

A gear box includes a gear box body of a reducer to which a motor is mounted. The gear box body includes a worm wheel holding section where a worm wheel of the reducer is held, and a motor holding section, where a part of the motor is contained, the motor holding section having a motor mounting opening. The motor holding section is configured such that a bottom of the motor holding section is provided in a region between a line L1 and a line L2. Here, the line L1 passes through the center C of the worm wheel holding section and is perpendicular to the axis line X of a motor shaft. The line L2 is a tangent line passing through an outer edge portion located near a circular outer peripheral wall of the worm wheel holding section on a motor side and is perpendicular to the axis line X of the motor shaft.

2 Claims, 14 Drawing Sheets

(51) Int. Cl.
*H02K 5/10* (2006.01)
*B29L 31/34* (2006.01)
*F16H 57/032* (2012.01)

(56) References Cited

U.S. PATENT DOCUMENTS

2003/0008746 A1 1/2003 Meier et al.
2008/0042470 A1 2/2008 Fleischer et al.

* cited by examiner

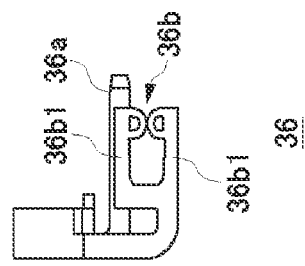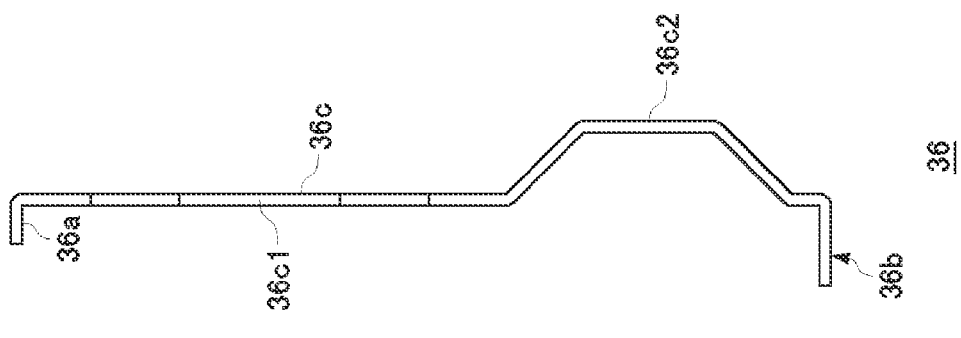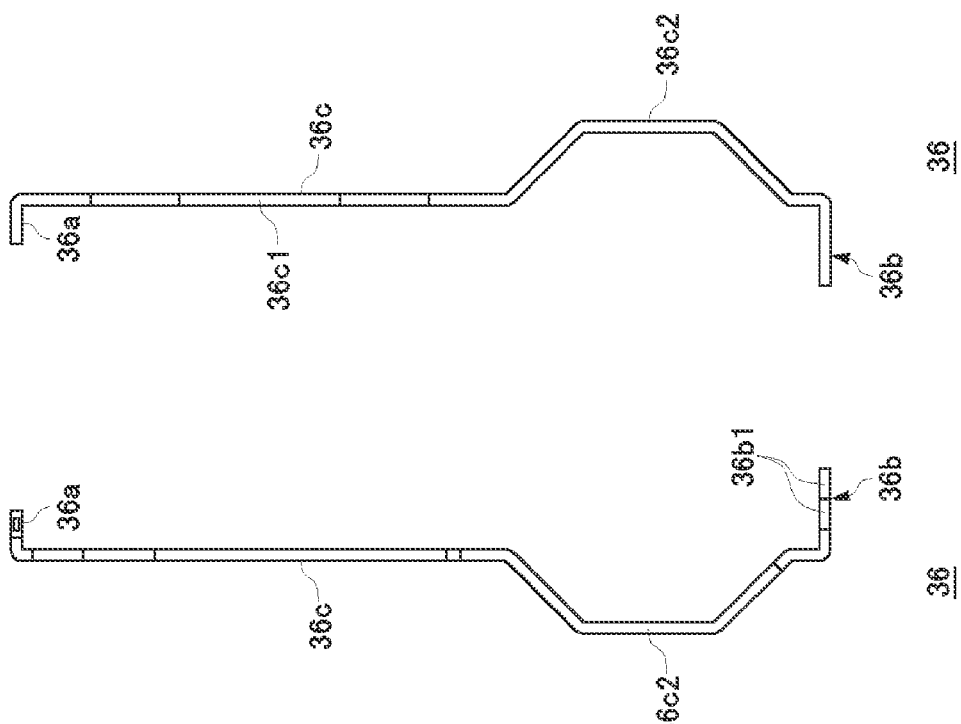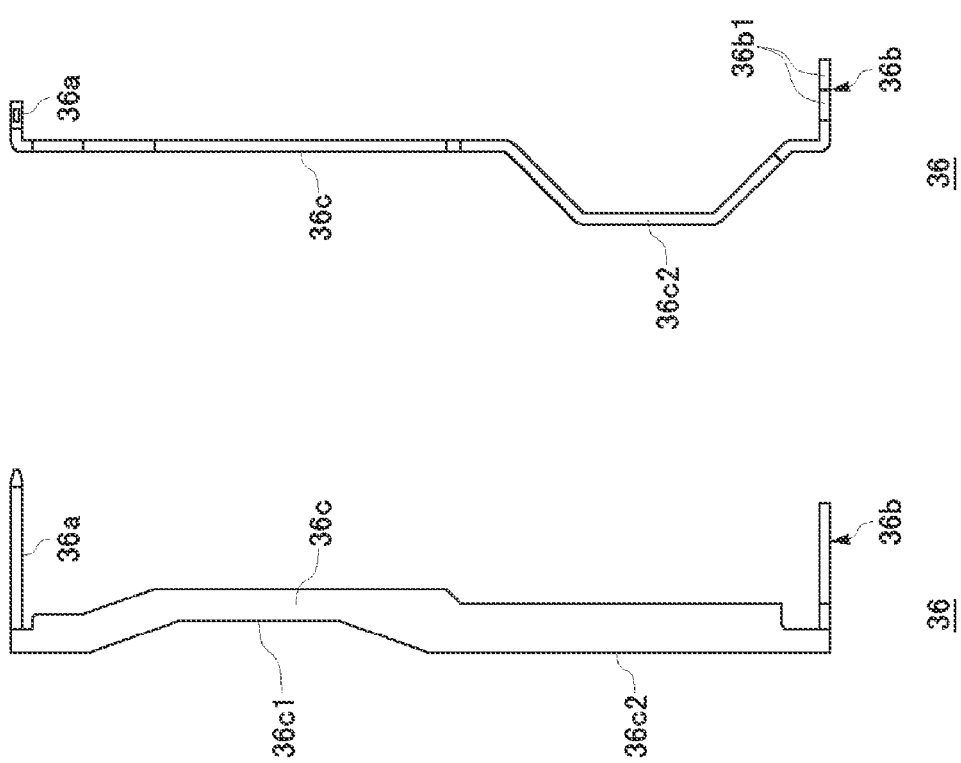

48

GEARBOX, AND METHOD FOR MANUFACTURING THE SAME

CROSS-REFERENCE TO RELATED APPLICATIONS

This application is based upon and claims the benefit of priority from the prior Japanese Patent Application No. 2013-128904, filed on Jun. 19, 2013, the entire content of which is incorporated herein by reference.

BACKGROUND OF THE INVENTION

1. Field of the Invention

The present invention relates to a gear box, and more particularly to a gear box used for a motor reducer.

2. Description of the Related Art

In the conventional practice, small-sized direct-current (DC) motors are used in electrical equipment for use in vehicle and other various types of apparatuses and devices. Here, the electrical equipment for use in vehicle includes an opening-and-closing apparatus for a power window mechanism (power window switchgear), an automotive opening-and-closing apparatus for a door-locking mechanism (automotive door-locking switchgear), an electric mirror surface driving/retracting apparatus, and an air conditioner, for instance. A motor unit in which a reducer for regulating the torque and the rotational speed of a motor is formed integrally with the motor is used in such equipment.

For example, Japanese Patent No. 3568415 discloses a motor unit comprising a housing, which is integrally molded by a synthetic resin, a DC motor fixed to the housing, and a speed reduction mechanism held inside the housing. A plurality of electric terminals (hereinafter referred to as "terminals" also) with which the signal lines from an electronic control unit and the power wires from a battery power supply are connected to the DC motor or circuit board are insert-molded into a connector portion of this motor unit. Also, the connector portion thereof is integrally formed with the housing using the synthetic resin.

It is to be noted here that, in the above-described motor unit, the motor and the connector portion are provided opposite to each other with the housing for holding a worm wheel therein located between the motor and the connector portion. As a result, the total length of the motor unit gets longer.

Also, there are cases where a terminal functioning as a power feeding passage leading from the connector portion to the motor is provided within the housing. In such a case, conceivable is a method where the housing is manufactured before the terminal is placed at a predetermined position within the housing. However, it is not easy to accurately place and secure the terminal onto a positioning portion in the housing. Accordingly, there is room for improvement in the method of manufacturing the housing where the terminal is provided.

SUMMARY OF THE INVENTION

The present invention has been made in view of the foregoing circumstances, and a purpose thereof is to provide a gear box having a new structure.

To resolve the foregoing problems, a gear box according to one embodiment of the present invention includes a gear box body of a reducer to which a motor is mounted. The gear box body includes: a worm wheel holding section where a worm wheel of the reducer is held; and a motor holding section where a part of the motor is contained, the motor holding section having a motor mounting opening. The motor holding section is configured such that a bottom of the motor holding section is provided in a region between a line L1 and a line L2, where the line L1 passes through a center of the worm wheel holding section and is perpendicular to an axis line of a motor shaft, and the line L2 is a tangent line passing through an outer edge portion located near a circular outer peripheral wall of the worm wheel holding section on a motor side and is perpendicular to the axis line of the motor shaft.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 9A is a top view of a second insert terminal of FIG. 8 as seen from a direction D5;

FIG. 9B is a top view of a second insert terminal of FIG. 8 as seen from a direction D6;

FIG. 9C is a top view of a second insert terminal of FIG. 8 as seen from a direction D7;

FIG. 9D is a top view of a second insert terminal of FIG. 8 as seen from a direction D8;

DETAILED DESCRIPTION OF THE INVENTION

Figure 1:
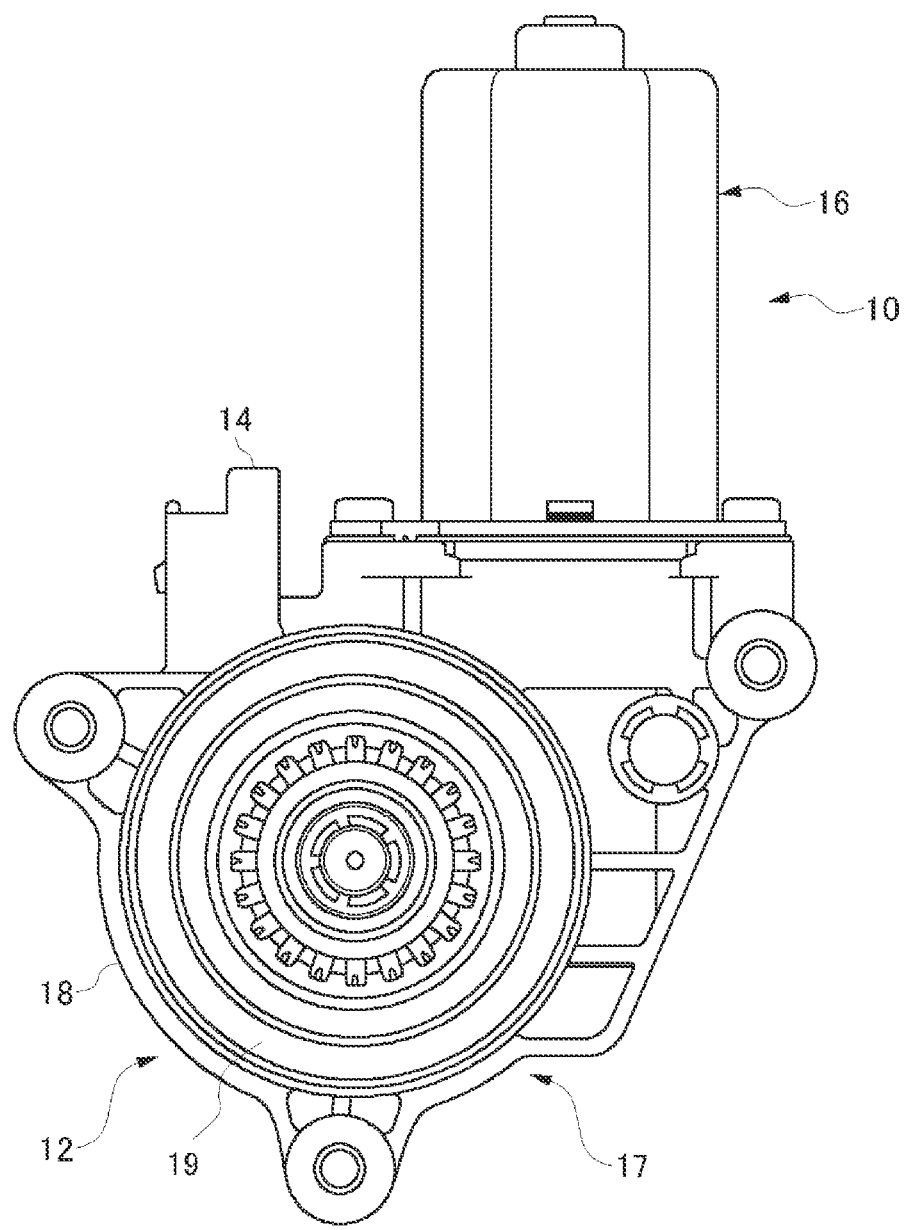
FIG. 1 is a front view of a motor with a reducer, according to an embodiment, as viewed from an output shaft side.

The invention will now be described by reference to the preferred embodiments. This does not intend to limit the scope of the present invention, but to exemplify the invention.

A gear box according to the embodiments of the present invention is used for reducers of various motors. As a motor with a reducer, the gear box is preferably used for electrical equipment for use in vehicle, such as electric window system, sunroof, powered seat and door closure of a motor vehicle.

A gear box according to one embodiment of the present invention includes a gear box body of a reducer to which a motor is mounted. The gear box body includes: a worm wheel holding section where a worm wheel of the reducer is held; and a motor holding section where a part of the motor is contained, the motor holding section having a motor mounting opening. The motor holding section is configured such that a bottom of the motor holding section is provided in a region between a line L1 and a line L2, where the line L1 passes through a center of the worm wheel holding section and is perpendicular to an axis line of a motor shaft, and the line L2 is a tangent line passing through an outer edge portion located near a circular outer peripheral wall of the worm wheel holding section on a motor side and is perpendicular to the axis line of the motor shaft.

By employing this embodiment, the motor can be brought closer to the center of the worm wheel holding section of the gear box body, so that a motor unit can be made smaller in size in its entirety.

The gear box body may further include a power feeding opening to which an external terminal connects, and the motor mounting opening and the power feeding opening may be formed on the same side of a lateral face of the gear box body. Thereby, the workability in mounting the motor and the external terminal to the gear box improves.

The gear box body may further include a power feeding opening to which an outer terminal connects, and the motor mounting opening and the power feeding opening may be formed such that the motor mounting opening and the power feeding opening are opened toward mutually different directions as seen from a lateral face of the gear box body.

The gear box body may further include a terminal integrally structured into the gear box such that at least part of the terminal is embedded in the gear box body. The terminal may be so arranged as to be exposed from the motor mounting opening. This eliminates a process of setting up again the terminal after the gear box has been manufactured, so that a manufacturing process can be simplified.

The terminal may have a curved portion or notch that are so formed as to circumvent an inner peripheral wall of the worm wheel holding section. This allows an insertion part, where an end of a casing of the motor is inserted, to be placed in a deeper position inside the gear box. Also, a layout can be designed so that the terminal is not exposed to an inner wall of the worm wheel holding section.

Another embodiment of the present invention relates to a method for manufacturing a gear box. The method is a method for manufacturing a gear box body of a reducer, to which a motor is mounted, in an integrally molded manner using a mold, and a terminal electrically connecting between two openings of the gear box body is integrally formed with the gear box body by insert molding.

According to this embodiment, the process of setting up again the terminal in the gear box is no longer necessary, so that the manufacturing process can be simplified.

The two openings may be a motor holding section, into which the terminal of the motor is inserted, and a power feeding opening, to which an external terminal connects. As a result, it is no longer required to assemble a power feeding connector and an adapter, which are additional components, to the gear box body. Thus the number of components can be reduced. Also, since each opening is integrally formed with the gear box body, packing materials and sealing members otherwise required if the airtightness and waterproofing property are to be taken into account are no longer necessary in the connection portions between the components. This can further reduce the number of components.

The terminal may be insert-molded by using a placing mold, on which the terminal is placed, and a holding section mold, which forms an outer peripheral wall of a worm wheel holding section where a worm wheel of the reducer is held, such that the terminal placed on the placing mold does not come in contact with a portion corresponding to the worm wheel holding section of the holding section mold. This prevents the terminal from being exposed on an inner circumference side of the worm wheel holding section, thereby helping improve the waterproofing property and the insulation quality.

The placing mold may support one side of the terminal, and the holding section mold may be such that a gate is provided on a side opposite to a terminal supported side. This makes it easy for the terminal to be pressed toward the placing mold by the flow of material (e.g., molten resin) flowing through the gate. Hence, the terminal is suppressed from moving at the time of the formation of the terminal without completely fixing the insert terminal. Also, since the insert terminal is configured such that only one side of the terminal is supported by the placing mold, the other side thereof is completely covered at the time of formation thereof. Thus, the holes created by pins or the like, for the purpose of the placement and the retainment, do not need to be filled in with something.

The gate may be provided in such a position that an injection-molding pressure P1 is greater than an injection-molding pressure P2, where the injection-molding pressure P1 is a pressure exerted in a direction where the terminal is pressed against the placing mold from the gate, and the injection-molding pressure P2 is a pressure exerted in a direction where the terminal is spaced apart from the placing mold from the terminal supported side. Thus, if the injection-molding pressures are to be applied from a plurality of directions according to the shape of a cavity of the mold, the terminal will be suppressed from moving at the time of the formation thereof without the terminal being completely fixed.

Optional combinations of the aforementioned constituting elements, and implementations of the invention in the form of methods, apparatuses, systems, and so forth may also be practiced as additional modes of the present invention.

Hereinafter, the present invention will be described based on preferred embodiments with reference to the accompanying drawings. The same or equivalent constituents or members illustrated in each drawing will be denoted with the same reference numerals, and the repeated description thereof will be omitted as appropriate. Moreover, the embodiments given hereinbelow are for illustrative purposes only and does not limit the scope of the present invention.

(Motor with a Reducer)

FIG. 1 is a front view of a motor 100 with a reducer, according to the present embodiment, as viewed from an output shaft side. The DC motor 100 with the reducer includes a motor 10 and a reducer 12 coupled to a shaft of the motor 10. The motor 10 is provided with a cylindrical housing 16. A reducer 12 has a worm wheel, a worm, and a gear box 17 containing the worm wheel and the worm. The gear box 17 includes a cylindrical gear box body 18 and a cover 19. A connector portion 14 used to feed electric power from outside is partially provided in the gear box body 18 by integrally molding the connector portion 14 with the gear box body 18.

(Gear Box)

Figure 2:
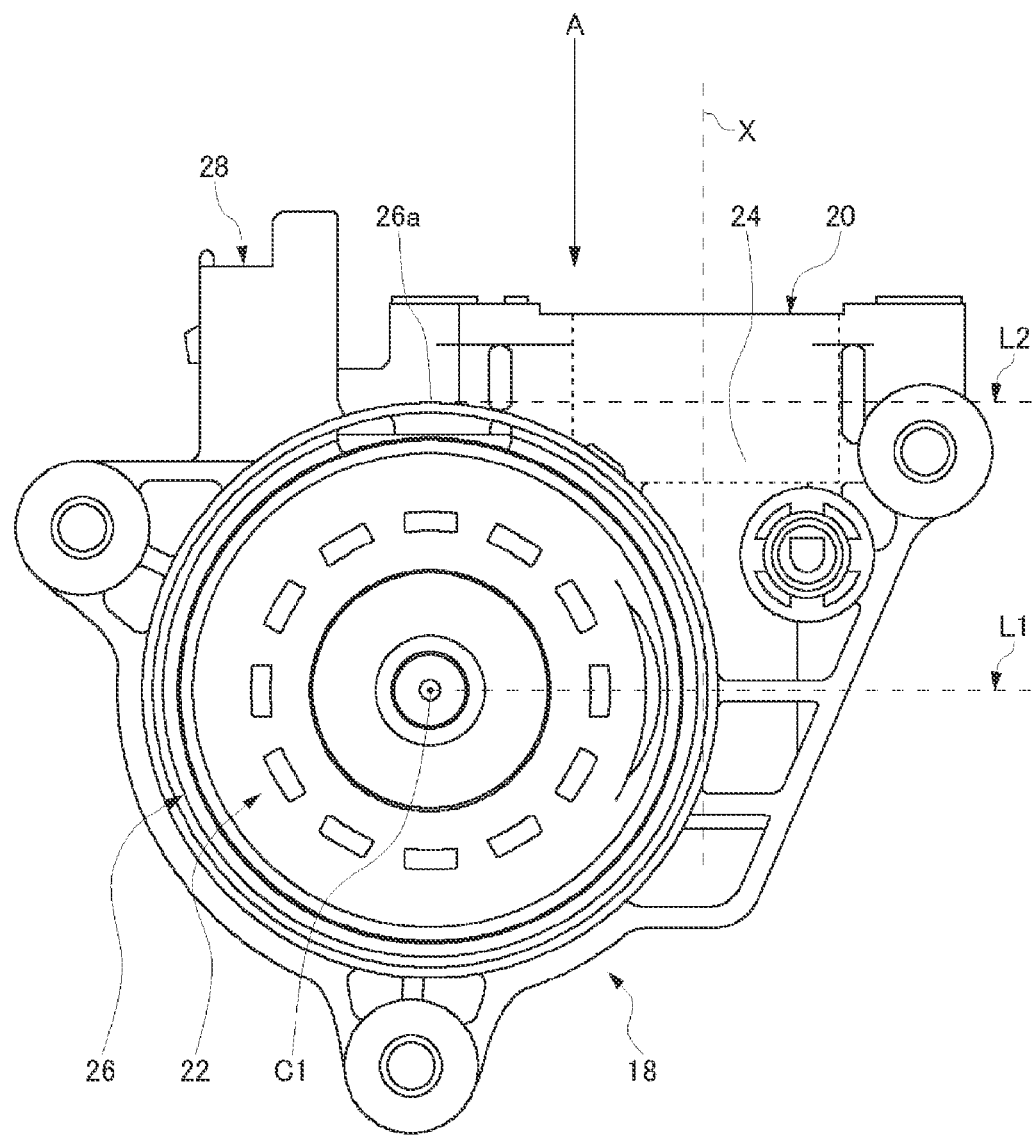
FIG. 2 is a top view showing essential parts of a gear box according to an embodiment.
Figure 3:
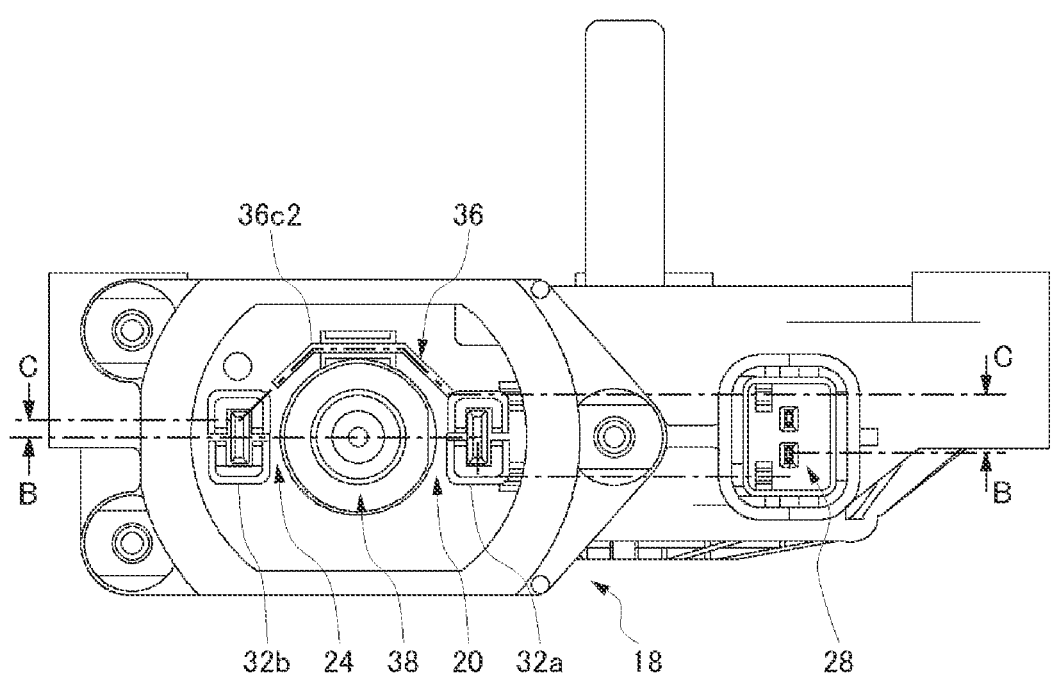
FIG. 3 is a side view of a gear box of FIG. 2 as seen in a direction A.
Figure 4:
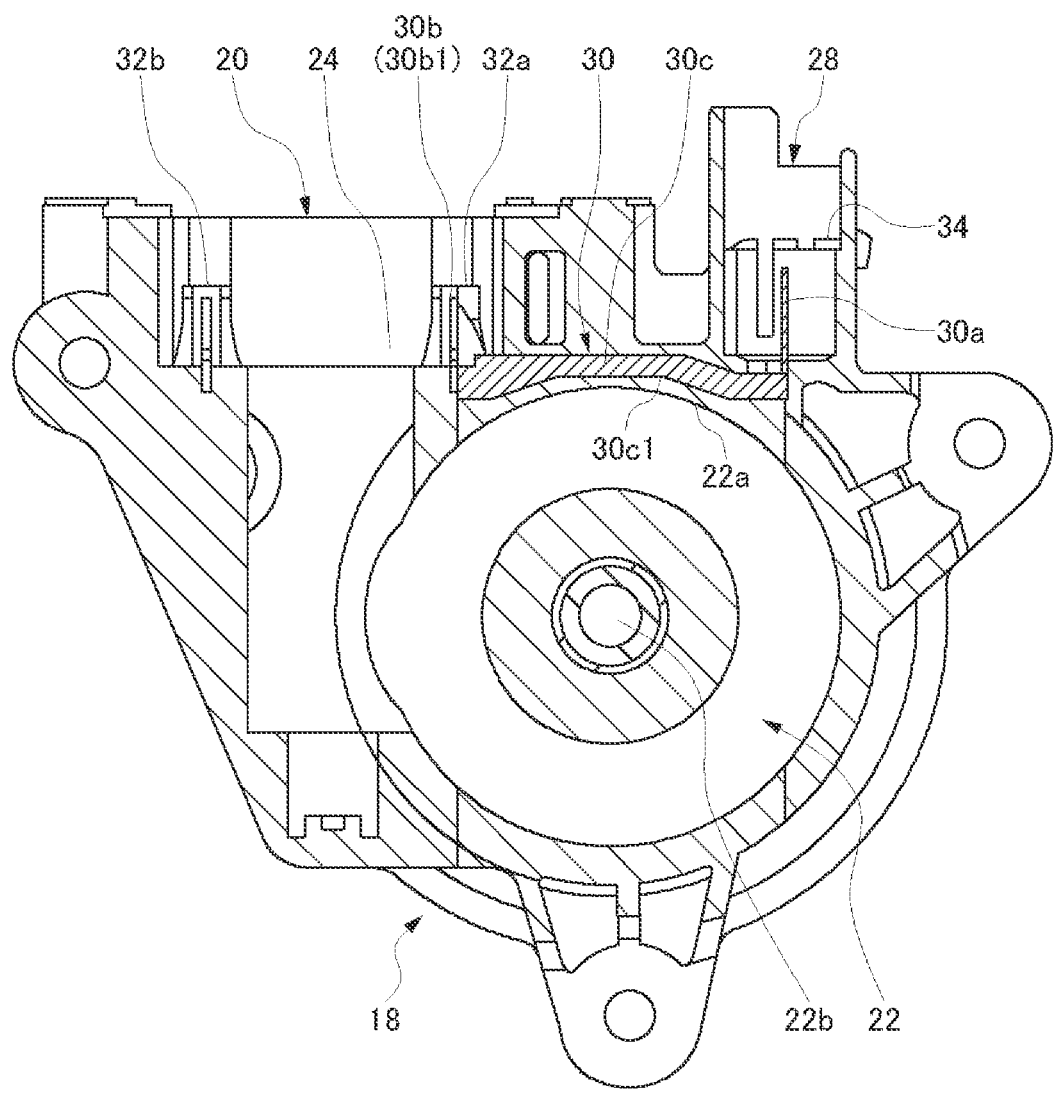
FIG. 4 is a cross-sectional view of a gear box taken along the line B-B of FIG. 3.
Figure 5:
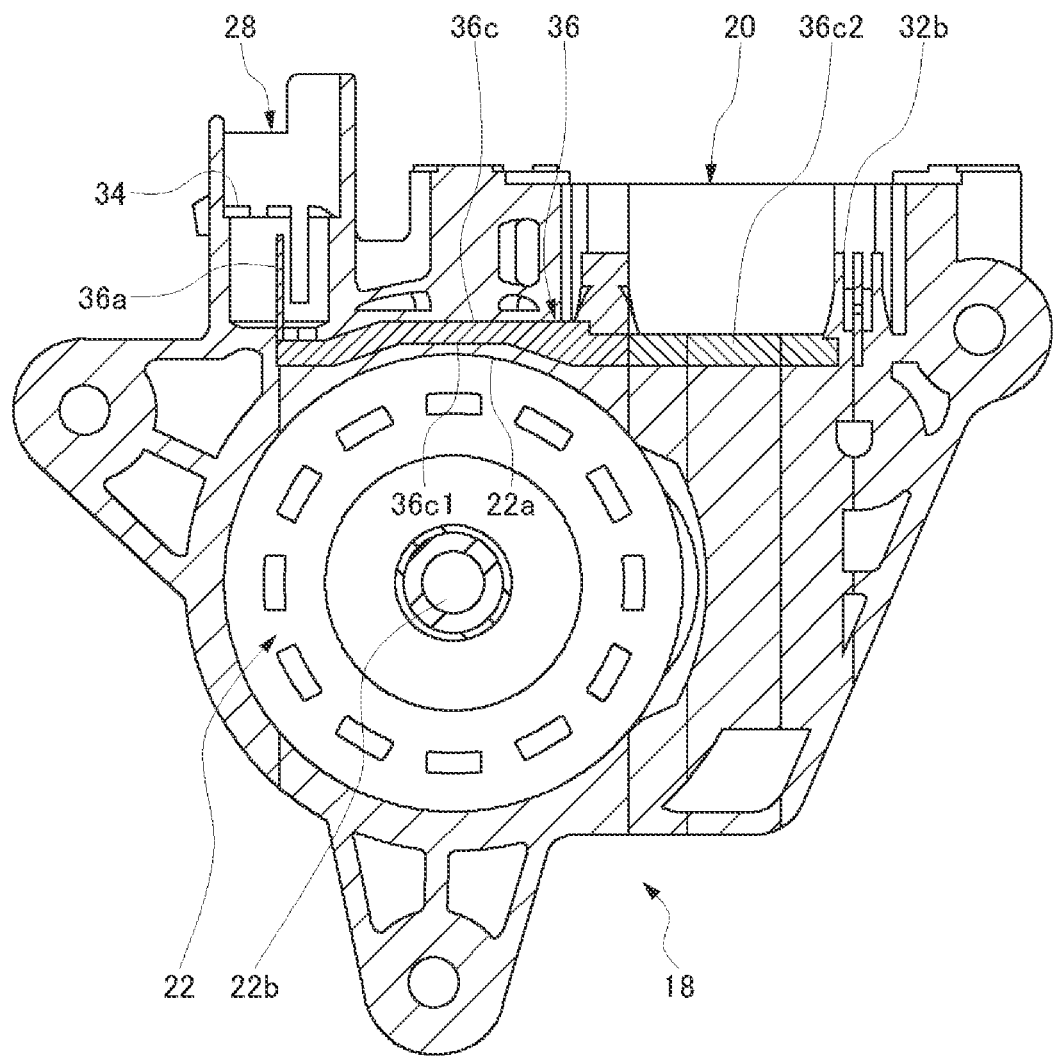
FIG. 5 is a cross-sectional view of a gear box taken along the line C-C of FIG. 3.

FIG. 2 is a top view showing essential parts of a gear box according to the present embodiment. FIG. 3 is a side view of the gear box of FIG. 2 as seen in a direction A. FIG. 4 is a cross-sectional view of the gear box taken along the line B-B of FIG. 3. FIG. 5 is a cross-sectional view of the gear box taken along the line C-C of FIG. 3.

The gear box 17 includes a gear box body 18 of the reducer 12 to which the motor 10 is mounted. The gear box body 18 has a worm wheel holding section 22, where a worm wheel of the reducer 12 is held, and a motor holding section 24, having a motor mounting opening 20, where a part of the motor 10 is contained. The motor holding section 24 is configured such that a bottom of the motor holding section 24 is provided in a region between a line L1 and a line L2. Here, the line L1 passes through a center C1 of the worm wheel holding section 22 and is perpendicular to an axis line X of a motor shaft. Also, the line L2 is a tangent line passing through an outer edge portion 26a located near a circular outer peripheral wall 26 of the worm wheel holding section 22 on a motor 10 side and is perpendicular to the axis line X of the motor shaft.

This configuration allows the motor 10 to be brought closer to the center C1 of the worm wheel holding section 22 of the gear box body 18, so that a motor unit can be made smaller in size in its entirety.

Also, the gear box body 18 has a power feeding opening 28 to which an external terminal connects. As shown in FIG. 2 to FIG. 5, the motor mounting opening 20 and the power feeding opening 28 are formed integrally on the same side of a lateral face of the gear box body 18. Thereby, the workability in mounting the motor and the external terminal to the gear box improves. Also, the total length of the motor 100 with the reducer can be made shorter than in the case where the motor mounting opening 20 and the power feeding opening 28 are provided opposite to each other with the gear box body 18 disposed between the motor mounting opening 20 and the power feeding opening 28.

The motor mounting opening and the power feeding opening may be formed such that the motor mounting opening and the power feeding opening are opened toward mutually different directions as seen from a lateral face of the gear box body, in consideration of the configuration and the assemblability of an apparatus, to which the gear box body is mounted, and the connection direction of the external terminal, for instance. In this case, the motor mounting opening and the power feeding opening may be formed on different sides of the lateral face of the gear box body or the motor mounting opening and the power feeding opening may be formed on the same side of the lateral face of the gear box body and but they are formed such that the directions of their openings are different from each other.

(Insert Terminal)

The gear box 17 according to the present embodiment is provided with two insert terminals that are integrally formed by insert molding at the time of manufacturing. As shown in FIG. 4, a first insert terminal 30 is arranged such that the first insert terminal 30 electrically connects between one connection portion 32a, provided in the motor mounting opening 20, and a connection portion 34, provided in the power feeding opening 28. Also, as shown in FIG. 5, a second insert terminal 36 is arranged such that the second insert terminal 36 electrically connects between the other connection portion 32b, provided in the motor mounting opening 20, and the connection portion 34 provided in the power feeding opening 28.

The first insert terminal 30 and the second insert terminal 36 are integrally structured into the gear box 17 such that at last part of the first insert terminal 30 and at least part of the second insert terminal 36 are embedded in the gear box body 18. Also, each insert terminal is arranged such that an end of each insert terminal is exposed from the motor mounting opening 20. This eliminates a process of setting up again the terminals after the gear box has been manufactured, so that a manufacturing process can be simplified. Also, each insert terminal is arranged such that an end of each insert terminal is exposed from the power feeding opening 28. This allows the external terminals to be directly connected to the insert terminals, thereby eliminating a process of separately setting up the terminals in the power feeding opening.

Figure 6:
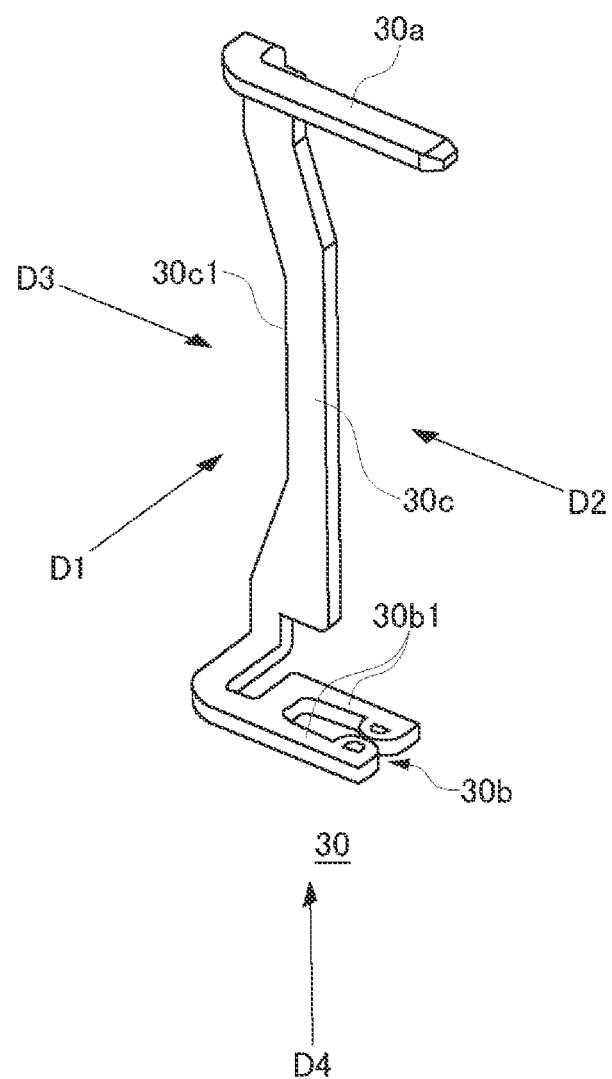
FIG. 6 is a perspective view of a first insert terminal according to an embodiment.
Figure 7A:
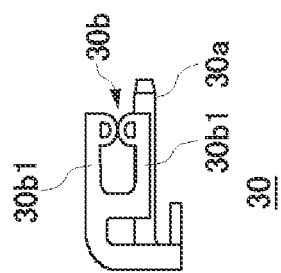
FIG. 7A is a top view of a first insert terminal of FIG. 6 as seen from a direction D1.
Figure 7B:
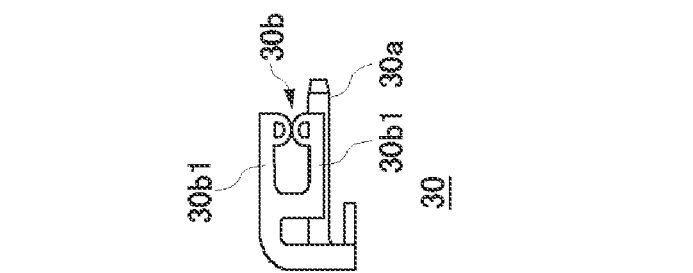
FIG. 7B is a side view of a first insert terminal of FIG. 6 as seen from a direction D2.
Figure 7C:
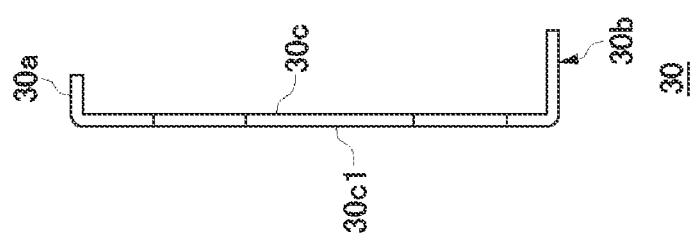
FIG. 7C is a side view of a first insert terminal of FIG. 6 as seen from a direction D3.
Figure 7D:
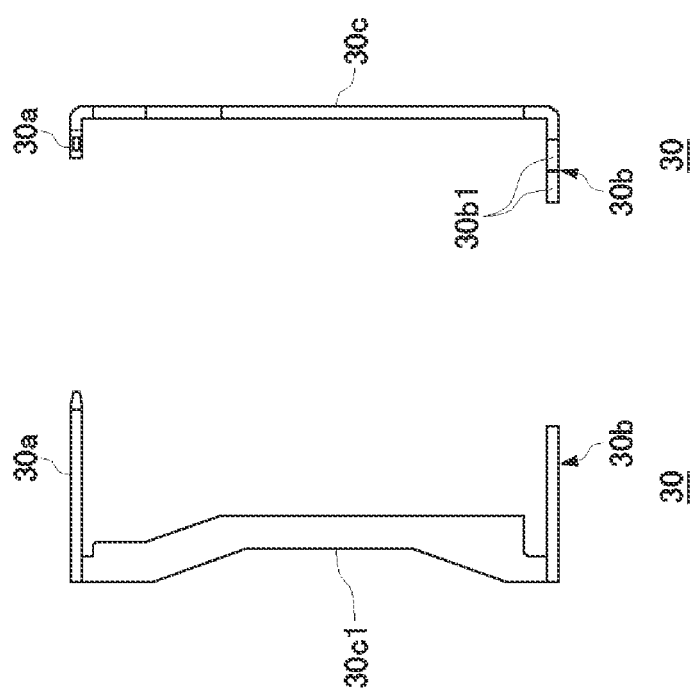
FIG. 7D is a side view of a first insert terminal of FIG. 6 as seen from a direction D4.

FIG. 6 is a perspective view of a first insert terminal according to the present embodiment. FIG. 7A is a top view of the first insert terminal of FIG. 6 as seen from a direction D1. FIG. 7B is a side view of the first insert terminal of FIG. 6 as seen from a direction D2. FIG. 7C is a side view of the first insert terminal of FIG. 6 as seen from a direction D3. FIG. 7D is a side view of the first insert terminal of FIG. 6 as seen from a direction D4.

The first insert terminal 30 is manufactured in such a manner that a plate-shaped member is punched out and then a part of the thus punched-out member is plastic-deformed. The plate-shaped member used herein is a metal, an alloy or the like having a high conductivity and, for example, copper or brass (an alloy of copper and zinc) may be suitable for the plate-shaped member. The first insert terminal 30 is structured such that a pin 30a, which projects toward the connection portion 34 inside the power feeding opening 28, is formed at one end of the first insert terminal 30 and such that a clamping part 30b, which projects toward the connection portion 32a inside the motor mounting opening 20, is formed at the other end thereof. The clamping part 30b has a pair of arms 30b1. Also, the first insert terminal 30 has a linkage portion 30c that couples the pin 30a and the clamping part 30b.

The pin 30a is connected to the external terminals and the connection portion 34, which are mounted to the power feeding opening 28 and which are used to electrically connect the power supply to a control apparatus. Also, signals and electric power are supplied to the pin 30a. The clamping part 30b holds a motor's terminal, inserted into the motor mounting opening 20, by and between tips of the pair of arms 30b1 projecting toward the connection portion 32a, thereby achieving the electrical connection.

The linkage portion 30c has a notch or cut-out portion (recess) 30c1 that is so formed as to circumvent an inner peripheral wall 22a of the worm wheel holding section 22. A curved portion may be provided instead of the notch 30c1.

Figure 8:
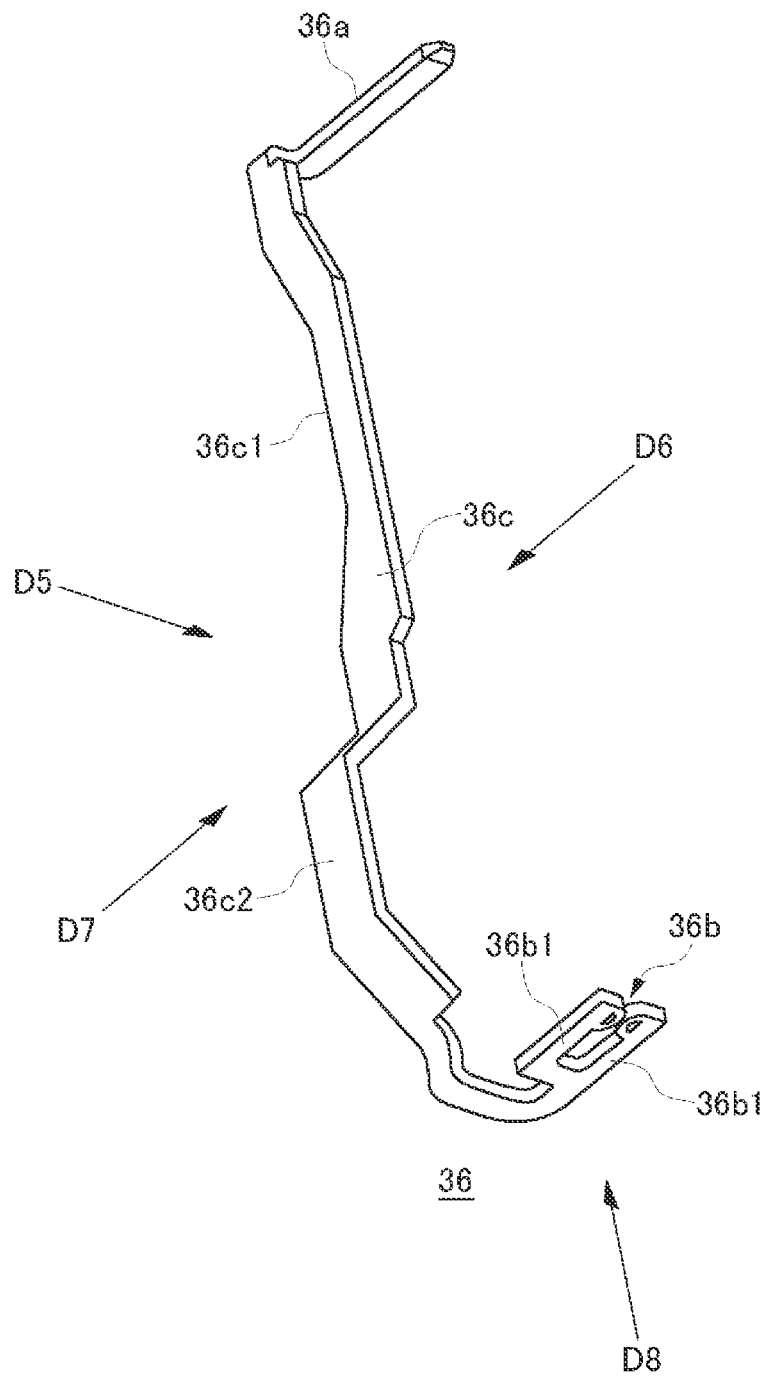
FIG. 8 is a perspective view of a second insert terminal according to an embodiment.

FIG. 8 is a perspective view of a second insert terminal according to the present embodiment. FIG. 9A is a top view of the second insert terminal of FIG. 8 as seen from a direction D5. FIG. 9B is a top view of the second insert terminal of FIG. 8 as seen from a direction D6. FIG. 9C is a top view of the second insert terminal of FIG. 8 as seen from a direction D7. FIG. 9D is a top view of the second insert terminal of FIG. 8 as seen from a direction D8.

The material used for the second insert terminal 36 and the method for manufacturing the second insert terminal are similar to those of the first insert terminal 30. The second insert terminal 36 is structured such that a pin 36a, which projects toward the connection portion 34 inside the power feeding opening 28, is formed at one end of the second insert terminal 36 and such that a clamping part 36b, which projects toward the connection portion 32b inside the motor mounting opening 20, is formed at the other end thereof. The clamping part 36b has a pair of arms 36b1. Also, the second insert terminal 36 has a linkage portion 36c that couples the pin 36a and the clamping part 36b.

The pin 36a is connected to the external terminals and the connection portion 34, which are mounted to the power feeding opening 28 and which are used to electrically connect the power supply to the control apparatus. Also, the signals and the electric power are supplied to the pin 36a. The clamping part 36b holds a motor's terminal, inserted into the motor mounting opening 20, by and between tips of the pair of arms 36b1 projecting toward the connection portion 32a, thereby achieving the electrical connection.

The linkage portion 36c has a notch or cut-out portion (recess) 36c1, which is so formed as to circumvent the inner peripheral wall 22a of the worm wheel holding section 22, and a bent part 36c2, which is so bent as not to cross a worm opening 38 shown n FIG. 3. A curved portion may be provided instead of the notch 36c1.

As described above, each terminal is provided with a circumventing portion having a shape formed such that the inner peripheral wall 22a of the worm wheel holding section 22 can be bypassed. This allows the motor holding section 24, where part of a casing of the motor is contained, and the connection portions 32a and 32b to be placed in deeper positions inside the gear box. Also, the terminals can be embedded or buried in the gear box body 18 so that the terminals are not exposed to the inner peripheral wall 22a of the worm wheel holding section 22. Hence, the waterproofing property and the insulation quality can be improved. Also, the distance between an axis of rotation 22c (see FIG. 4 and FIG. 5) of the worm wheel in the worm wheel holding section 22, which functions as an output shaft of the gear box 17, and an end of the motor 10 opposite to an end thereof on a worm side. Hence, the vibration is suppressed.

Although each of the insert terminals 30 and 36 according to the present embodiment is constructed in such a manner that a single rolled member is processed, each terminal may be configured by not only a single component but also a plurality of components. For example, a portion corresponding to each of the linkage portions 30c and 36c may be constructed by a jumper wire, and the clamping parts 30b and 36b and the pins 30a and 36a may be constructed by other components. In such a case, the jumper wire only may be first insert-molded into the gear box body 18 such that at least part of each insert terminal is buried in the gear box body 18. Then end-part components, such as the clamping parts and the pins, are press-fitted to the gear box body 18 so as to be integrally formed with the jumper wires.

(Method for Manufacturing a Gear Box)

A description is now given of a preferred exemplary method for manufacturing a gear box according to the present embodiment. This method is a method for manufacturing a gear box body of a reducer, to which a motor is mounted, in an integrally molded manner using a mold.

Figure 10A:
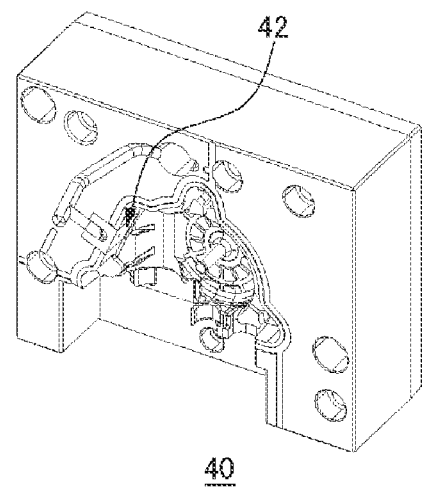
FIG. 10A is a perspective view of a fixed mold for mainly molding an external form of a gear box body.
Figure 10B:
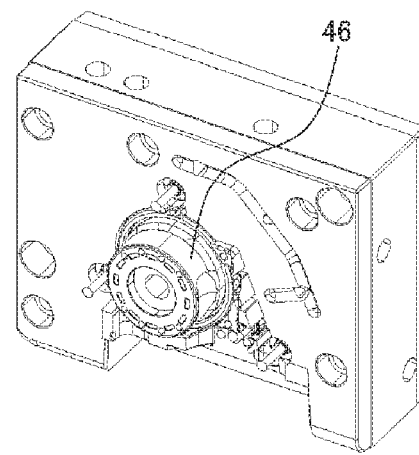
FIG. 10B is a perspective view of a movable mold for mainly molding a worm wheel holding section of a gear box body.
Figure 10C:
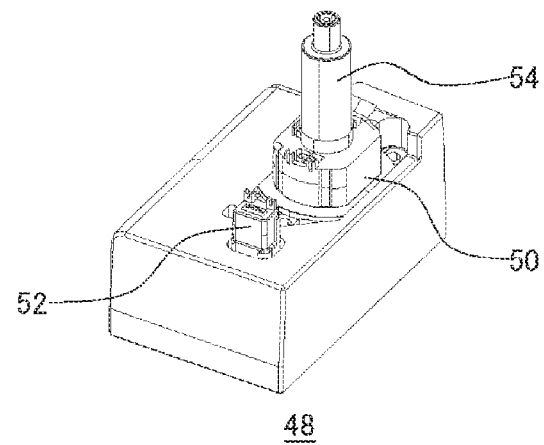
FIG. 10C is a perspective view of a slide mold for mainly molding two openings of a gear box body.

FIG. 10A is a perspective view of a fixed mold for mainly molding an external form of a gear box body. FIG. 10B is a perspective view of a movable mold for mainly molding a worm wheel holding section of a gear box body. FIG. 10C is a perspective view of a slide mold for mainly molding two openings of a gear box body.

A gate 42, through which a molten resin is introduced to a cavity inside the mold from the outside, is provided in a fixed mold 40 shown in FIG. 10A. A cylindrical protrusion 46, which is used to form a space corresponding to the worm wheel holding section 22 of the worm wheel in the gear box body 18, is provided in a movable mold 44 shown in FIG. 10B. A protrusion 50 and a protrusion 52, which are used to form spaces corresponding to the motor mounting opening 20 and the power feeding opening 28 in the gear box body 18 are provided in a slide mold 48 shown in FIG. 10C. Also, a columnar portion 54, which is used to form a space into which a worm secured to the motor shaft of the motor 10 is fit and contained is provided on top of the protrusion 52 in the movable mold 44.

Figure 11:
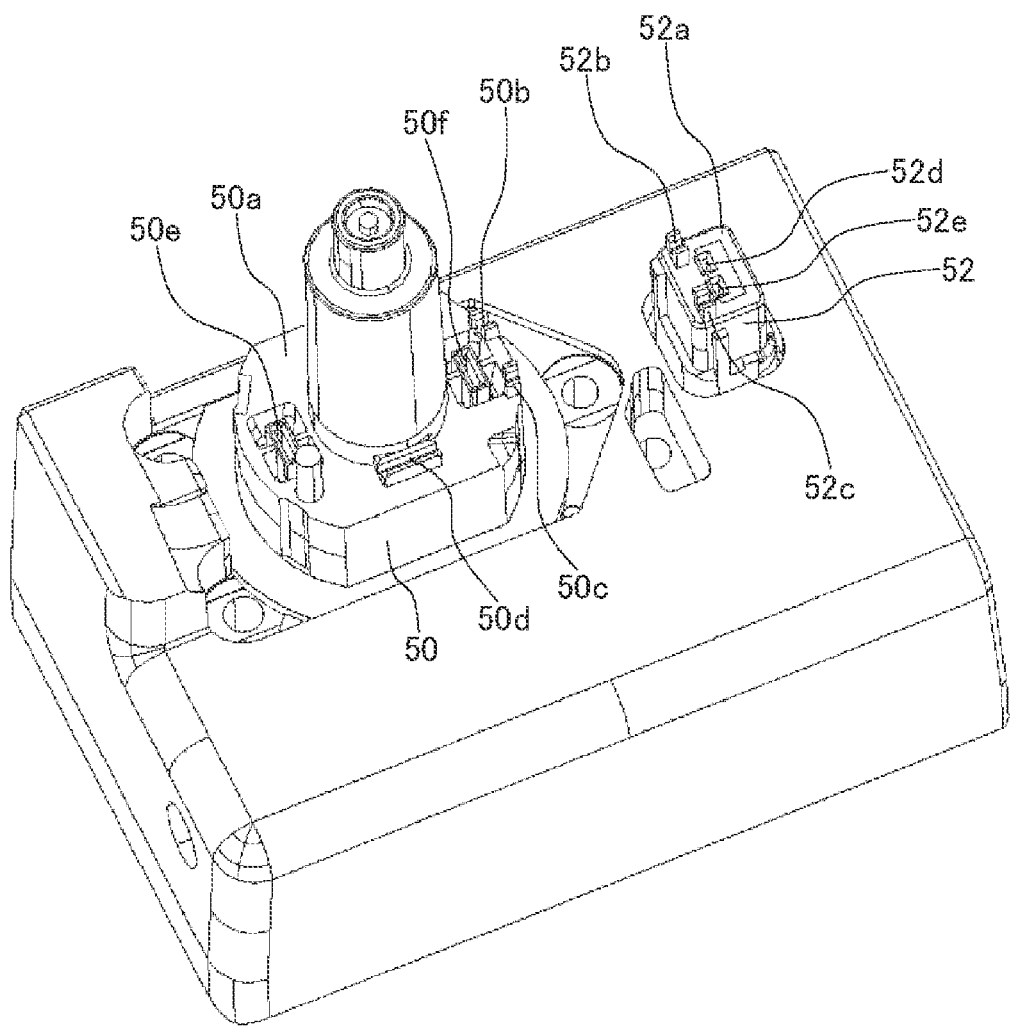
FIG. 11 is a perspective view of a slide mold as viewed from top.
Figure 12:
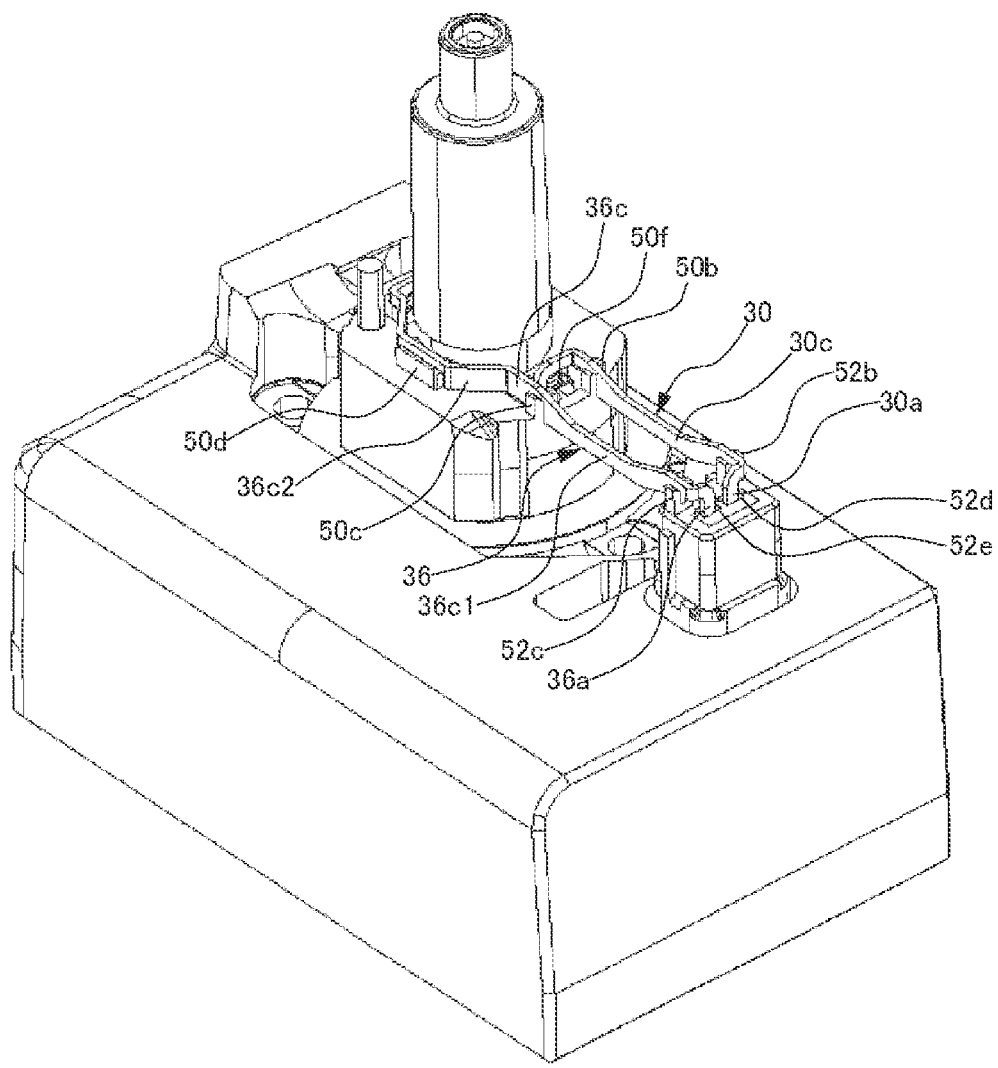
FIG. 12 is a perspective view of a slide mold where two insert terminals are placed.

FIG. 11 is a perspective view of the slide mold 48 as viewed from top. FIG. 12 is a perspective view of the slide mold 48 where the two insert terminals are placed.

As shown in FIG. 11, in the slide mold 48, three grooves 50b, 50c and 50d and two terminal insertion parts 50e and 50f are formed on a top face 50a of the protrusion 50. Also, two grooves 52b and 52c and two terminal insertion parts 52d and 52e are formed a top face 52a of the protrusion 52.

While the pin 30a is being inserted into the terminal insertion part 52d and the clamping part 30b is being inserted into the terminal insertion part 50f, the linkage portion 30c of the first insert terminal 30 is supported by the grooves 50b and 52b. In other words, the first insert terminal 30 is held and supported at four positions, namely, cantilevered by the terminal insertion parts 52d and 50f and the grooves 50b and 52b of the slide mold 48 and is not held and supported by the other molds. Thus the first insert terminal 30 is insert-molded such that the side on which the first insert terminal 30 is held and supported and its opposite side on which it is not are covered as a whole with resin.

While the pin 36a is being inserted into the terminal insertion part 52e and the clamping part 36b is being inserted into the terminal insertion part 50e, the notch 36c1 in the linkage portion 36c of the second insert terminal 36 is supported by the grooves 50c and 52c and the bent part 36c2 thereof is supported by the groove 50d. In other words, the second insert terminal 36 is held and supported at five positions, namely, cantilevered by the terminal insertion parts 52e and 50e and the grooves 50c, 50d and 52c of the slide mold 48 and is not held and supported by the other molds. Thus the second insert terminal 36 is insert-molded such that the side on which the second insert terminal 36 is held and supported and its opposite side on which it is not are covered as a whole with resin.

Figure 13:
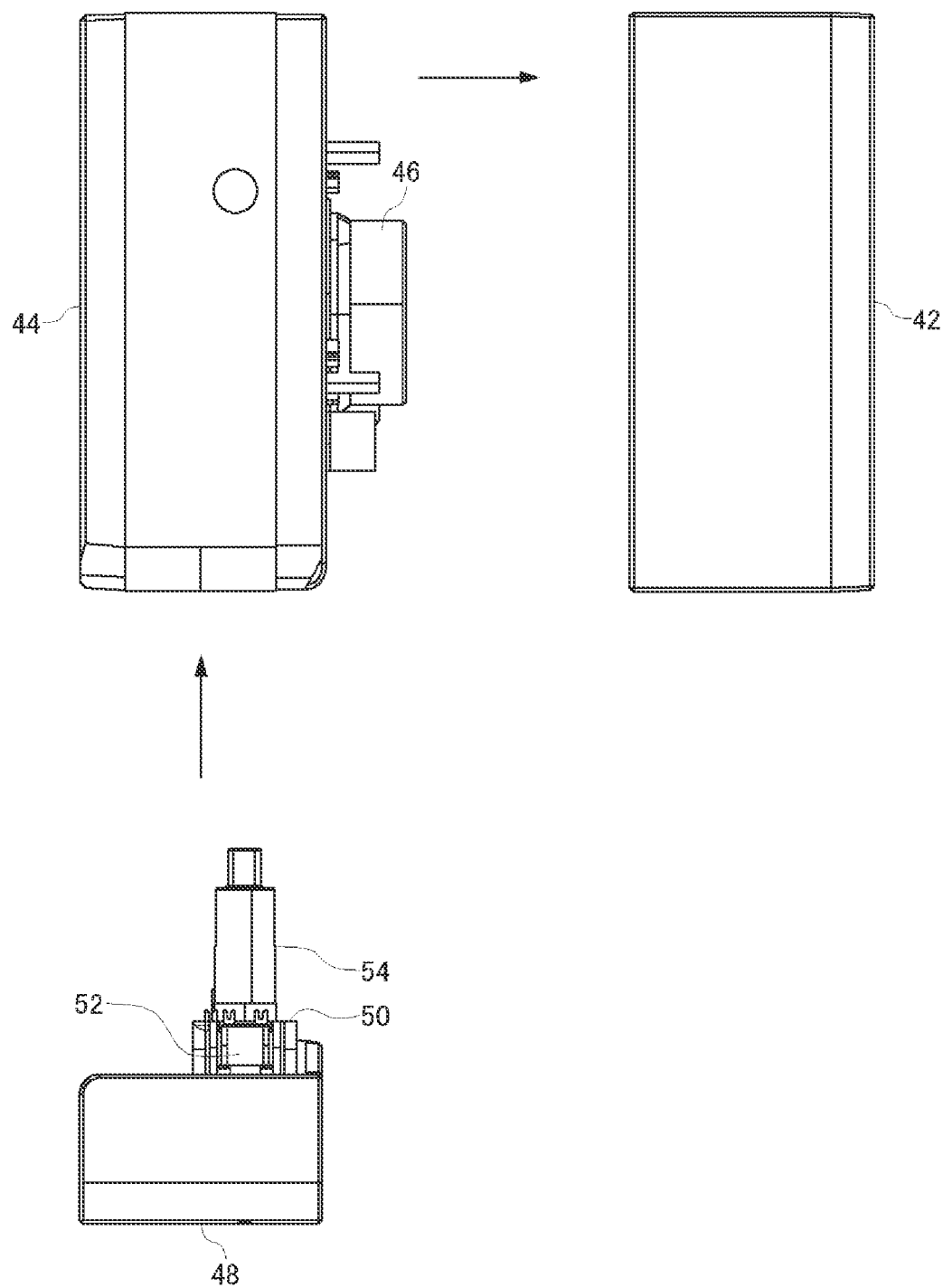
FIG. 13 is diagrams showing the order in which each mold is to be assembled.

FIG. 13 is diagrams showing the order in which each mold is to be assembled. As shown in FIG. 13, the slide mold 48 on which the insert terminals are placed is aligned with the movable mold 44 and is moreover aligned with the fixed mold 40. In this state, the molten resin is injected into the cavity inside the mold from the aforementioned gate 42 of the fixed mold 40. Then the first insert terminal 30 and the second insert terminal 36, which electrically connect between the two openings of the gear box body 18 are integrally formed with the gear box body 18 by the insert molding.

As described above, the manufacturing method according to the present embodiment uses the placing slide mold 48, by which the first insert terminal 30 and the second insert terminal 36 are placed in predetermined positions, and the fixed mold 40 and the movable mold 44, which form the outer peripheral wall 26 of the worm wheel holding section 22 containing the worm wheel of the reducer. Then each insert terminal placed on the slide mold 48 is insert-molded such that each insert terminal does not come in contact with the cylindrical protrusion 46 corresponding to the worm wheel holding section 22 of the slide mold 48. This prevents each insert terminal from being exposed on an inner circumference side of the worm wheel holding section 22, thereby helping improve the waterproofing property and the insulation quality. Also, this method eliminates the process of setting up again the terminals in the gear box, so that the manufacturing process can be simplified.

Also, the two openings in the gear box body 18 according to the present embodiment are the motor mounting opening 20, into which the terminal of the motor is inserted, and the power feeding opening 28, to which an external terminal connects. As a result, it is no longer required to assemble a power feeding connector and an adapter, which are additional components, to the gear box body 18. Thus the number of components can be reduced. Also, since each opening is integrally formed with the gear box body 18, packing materials and sealing members otherwise required if the airtightness and waterproofing property are to be taken into account are no longer necessary in the connection portions between the components. This can further reduce the number of components and, at the same time, reducing the connection portions improves the airtightness and thereby helps improve the waterproofing property and helps reduce the noise. Also, reducing the number of components can reduce the total number of assembling steps. Also, spaces otherwise required for the additional components such as the power feeding connector and the adapter connector are no longer necessary and therefore the gear box and the motor with the reducer can be made smaller sized and lighter-weighted.

Figure 14:
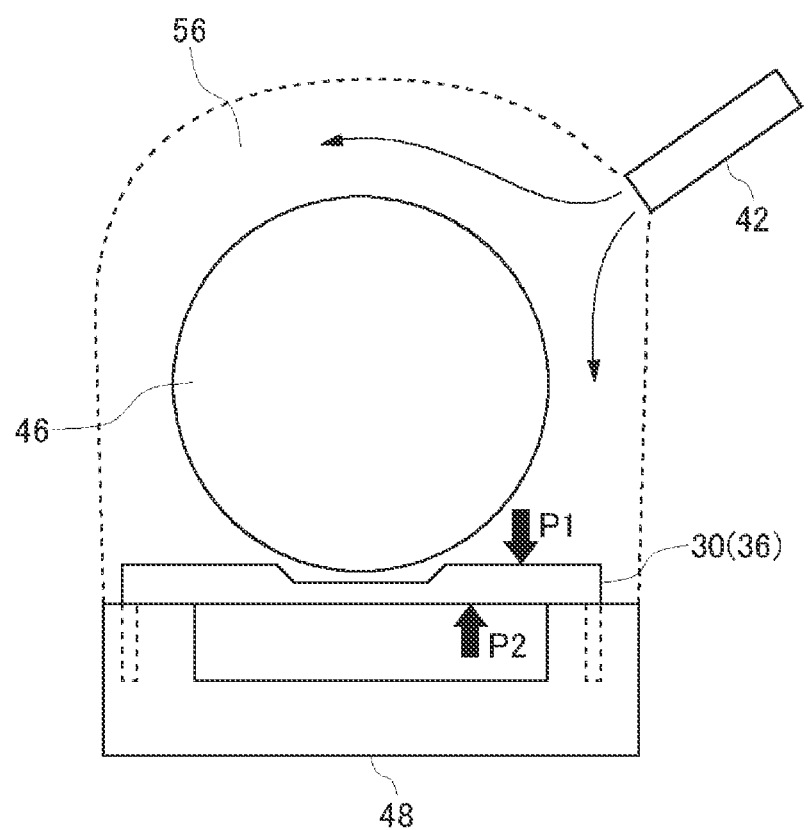
FIG. 14 schematically illustrates a relation between positions of a gate and insert terminals inside a cavity at the time of formation and a flow of resin at the time of formation.

Also, in each mold according to the present embodiment, the slide mold 48 supports one side of each insert terminal, and the fixed mold 40 is configured such that the gate 42 is provided on a side of each insert terminal opposite to a terminal supported side. FIG. 14 schematically illustrates a relation between positions of a gate and insert terminals inside a cavity at the time of formation and a flow of resin at the time of formation.

As shown in FIG. 14, the use of each mold according the present embodiment makes it easy for the first insert terminal 30 and the second insert terminal 36 to be pressed toward the slide mold 48 by the flow of the molten resin material flowing through the gate 42. This suppresses the terminals from moving (floating) at the time of the formation of the insert terminals 30 and 36 without completely fixing the insert terminals 30 and 36. Also, since each of the insert terminals 30 and 36 is configured such that only one side of each of them is supported by the slide mold 48, the other side thereof is completely covered at the time of formation thereof. Thus, the holes created by pins or the like, for the purpose of the placement and the retainment, do not need to be filled in with something.

A columnar protrusion 46 of the movable mold 44 exists in the center of a cavity 56 formed using each mold according to the present embodiment. As a result, the molten resin material injected through the gate 42 covers each of the insert terminals 30 and 36 after passing through a plurality of passages. Also, if there is a space between the slide mold 48 and each of the insert terminals 30 and 36, there may be cases where an injection-molding pressure P2 exerts in a direction where each of the insert terminals 30 and 36 is uplifted, depending on the flow of the molten resin.

In the light of this, the gate 42 according to the present embodiment is provided in such a position that an injection-molding pressure P1 is greater than the injection-molding pressure P2. Here, the injection-molding pressure P1 is a pressure exerted in a direction where the terminal is pressed against the slide mold 48 from the gate 42. And the injection-molding pressure P2 is a pressure exerted in a direction where the terminal is spaced apart from the placing mold from the terminal supported side. Thus, if the injection-molding pressures are to be applied from a plurality of directions according to the shape of the cavity of the mold, the terminal will be suppressed from moving at the time of the formation thereof without the terminal being completely fixed.

The present invention has been described by referring to the above-described embodiments. However, the present invention is not limited to the above-described embodiments only, and those resulting from any appropriate combination or substitution of components in the embodiments are also effective as embodiments. Also, it is understood by those skilled in the art that modifications such as changes in the order of combination or processings made as appropriate in the embodiments or various changes in design may be added to the embodiments based on their knowledge and that the embodiments added with such modifications are also within the scope of the present invention.

What is claimed is:

1. A gear box including a gear box body of a reducer to which a motor is mounted,
   the gear box body including:
      a worm wheel holding section where a worm wheel of the reducer is held;
      a motor holding section where a part of the motor is contained, the motor holding section having a motor mounting opening; and
      a first terminal integrally structured into the gear box such that at least part of the first terminal is embedded in the gear box body,
   the motor mounting opening is a space formed in the gear box body into which a second terminal of the motor is inserted,
   wherein the motor holding section is configured such that a bottom of the motor holding section is provided in a region between a line L1 and a line L2,
      where the line L1 passes through a center of the worm wheel holding section and is perpendicular to an axis line of a motor shaft, and the line L2 is a tangent line passing through an outer edge portion located near a circular outer peripheral wall of the worm wheel holding section on a motor side and is perpendicular to the axis line of the motor shaft; and
   wherein the first terminal is so arranged as to be exposed from the motor mounting opening, and has a curved portion or notch so formed as to circumvent an inner peripheral wall of the worm wheel holding section, and has a bent part so formed as to circumvent a worm opening.

2. A gear box according to claim 1, wherein the gear box body further includes a power feeding opening to which an external terminal connects, and wherein the motor mounting opening and the power feeding opening are formed on the same side of a lateral face of the gear box body.

* * * * *